United States Patent
Sharma

(10) Patent No.: US 7,161,875 B2
(45) Date of Patent: Jan. 9, 2007

(54) THERMAL-ASSISTED MAGNETIC MEMORY STORAGE DEVICE

(75) Inventor: Manish Sharma, Mountain Veiw, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 616 days.

(21) Appl. No.: 10/460,786

(22) Filed: Jun. 12, 2003

(65) Prior Publication Data

US 2004/0252590 A1 Dec. 16, 2004

(51) Int. Cl.
*G11B 5/74* (2006.01)

(52) U.S. Cl. .................. 369/13.05; 360/324.2

(58) Field of Classification Search ............. 369/13.05, 369/13.38, 157; 360/59, 313, 324.2; 365/173, 365/171, 158, 55
See application file for complete search history.

(56) References Cited

U.S. PATENT DOCUMENTS

| | | | |
|---|---|---|---|
| 5,695,864 A | | 12/1997 | Slonczewski et al. |
| 6,333,827 B1 * | | 12/2001 | Hamamoto et al. ...... 369/13.05 |
| 6,385,082 B1 | | 5/2002 | Abraham et al. |
| 6,404,647 B1 | | 6/2002 | Anthony et al. |
| 6,507,552 B1 | | 1/2003 | Gibson |
| 6,538,917 B1 | | 3/2003 | Tran et al. |
| 6,538,920 B1 | | 3/2003 | Sharma et al. |
| 6,771,534 B1 * | | 8/2004 | Stipe ........................... 365/158 |
| 6,819,587 B1 * | | 11/2004 | Sharma ....................... 365/173 |
| 6,885,582 B1 * | | 4/2005 | Sharma ....................... 365/173 |
| 6,944,101 B1 * | | 9/2005 | Johns et al. .............. 369/13.13 |
| 6,977,839 B1 * | | 12/2005 | Sharma ....................... 365/173 |
| 6,996,033 B1 * | | 2/2006 | Dugas et al. ............. 369/13.17 |
| 7,006,336 B1 * | | 2/2006 | Coffey et al. ................ 360/313 |
| 2001/0019461 A1 | | 9/2001 | Allenspach |
| 2003/0128633 A1 * | | 7/2003 | Batra et al. .............. 369/13.32 |
| 2003/0179658 A1 | | 9/2003 | Shimazaki |

FOREIGN PATENT DOCUMENTS

| | | |
|---|---|---|
| DE | 10029593 A1 | 1/2001 |
| EP | 0718824 A | 6/1996 |
| EP | 0734017 B1 | 11/2001 |
| EP | 0784847 B1 | 2/2002 |
| EP | 1211680 A2 | 6/2002 |
| EP | 1233412 A2 | 8/2002 |
| EP | 1251503 A2 | 10/2002 |
| EP | 1260481 A2 | 11/2002 |
| EP | 1261023 A2 | 11/2002 |
| EP | 1261024 A2 | 11/2002 |
| WO | WO0227713 A | 4/2002 |
| WO | WO2004032116 A | 4/2004 |

* cited by examiner

*Primary Examiner*—Angel Castro

(57) ABSTRACT

A thermal-assisted probe based magnetic memory storage device. In a particular embodiment, magnetic tunnel junction memory cells and at least one movable probe with a tip characterized by a conductor and a heat generator are provided. The movable probe may be placed in electrical and thermal contact with a given memory cell. The memory cells include a material wherein the coercivity is decreased upon an increase in temperature. The magnetic field provided by the read conductor will not alter the orientation of an unheated cell, but may alter the orientation of a heated cell. A related method of use is also provided.

30 Claims, 5 Drawing Sheets

THERMAL-ASSISTED MAGNETIC MEMORY STORAGE DEVICE

FIELD OF THE INVENTION

This invention relates generally to ultra-high density thermally assisted magnetic memory devices, and in particular to nanotip probe based magnetic memory arrays.

BACKGROUND OF THE INVENTION

Today's computer systems are becoming increasingly sophisticated, permitting users to perform an ever increasing variety of computing tasks at faster and faster rates. The size of the memory and the speed at which it can be accessed bear heavily upon the overall speed of the computer system.

Memory for a computer system is technically any form of electronic, magnetic or optical storage; however it is generally divided up into different categories based in part upon speed and functionality. The two general categories of computer memory are main memory and mass storage. Main memory is generally comprised of fast, expensive volatile random access memory that is connected directly to the processor by a memory buss.

Mass storage devices are typically permanent non-volatile memory stores which are understood to be less expensive, slow, large capacity devices such as hard drives, tape drives, optical media, and other mass storage devices. The primary objective of mass storage devices is to store an application or data until it is required for execution in main memory. In contrast to the main memory stores that may operate with access times of less than 100 nanoseconds, these mass storage devices operate with access times generally in excess of 1 millisecond.

Generally, the principle underlying the storage of data in a magnetic media (main or mass storage) is the ability to change, and or reverse, the relative orientation of the magnetization of a storage data bit (i.e the logic state of a "0" or a "1"). The coercivity of a material is the level of demagnetizing force that must be applied to a magnetic particle to reduce and or reverse the magnetization of the particle. Generally speaking, the smaller the magnetic particle the higher it's coercivity.

A prior art magnetic memory cell can be a tunneling magnetoresistance memory cell (TMR), a giant magnetoresistance memory cell (GMR), or a colossal magnetoresistance memory cell (CMR), each of which generally includes a data layer (also called a storage layer or bit layer), a reference layer, and an intermediate layer between the data layer and the reference layer. The data layer, the reference layer, and the intermediate layer can be made from one or more layers of material.

The data layer is usually a layer of magnetic material that stores a bit of data as an orientation of magnetization that may be altered in response to the application of external magnetic fields. More specifically, the orientation of magnetization of the data layer representing the logic state can be rotated (switched) from a first orientation representing a logic state of "0" to a second orientation, representing a logic state of "1", and/or vice versa.

The reference layer is usually a layer of magnetic material in which an orientation of magnetization is "pinned", as in fixed, in a predetermined direction. Often several layers of magnetic material are required and function as one to effectuate a stable pinned reference layer. The predetermined direction is determined and established by microelectronic processing steps employed in the fabrication of the magnetic memory cell.

Typically, the logic state (a "0" or a "1") of a magnetic memory cell depends on the relative orientations of magnetization in the data layer and the reference layer. For example, when an electrical potential bias is applied across the data layer and the reference layer in a TMR cell (also known as a tunnel junction memory cell), electrons migrate between the data layer and the reference layer through the intermediate layer. The intermediate layer is typically a thin dielectric layer commonly referred to as a tunnel barrier layer. The phenomena that cause the migration of electrons through the barrier layer may be referred to as quantum mechanical tunneling or spin tunneling. The logic state may be determined by measuring the resistance of the memory cell. For example, if the overall orientation of the magnetization in the data storage layer is parallel to the pinned orientation of magnetization in the reference layer the magnetic memory cell will be in a state of low resistance. If the overall orientation of the magnetization in the data storage layer is anti-parallel (opposite) to the pinned orientation of magnetization in the reference layer the magnetic memory cell will be in a state of high resistance.

As computer manufacturers and code developers strive to achieve faster and more powerful systems and applications, the speed of access and total memory capacity of mass storage devices become focal points of concern. Advances in technology have greatly increased the storage capacity of mass storage devices such as hard drives. However generally speaking mass storage devices employ a system of physical movement to read and write data over high cost electronic access methods utilized in traditional main memory.

The physical movement component of a mass storage device directly affects the latency in accessing data. For example, the latency in access time with hard drives is a factor of: 1) moving the read head to the appropriate radial location over the spinning disk, and 2) waiting for the spinning disk to rotate sufficiently to place the desired data bit directly in line with the read head.

Because hard disks may rotate at several thousand revolutions per minute, precise tolerances in manufacturing must be maintained to ensure that read/write transport does not inadvertently contact the media storage surface and cause damage. In addition, the data bits provided upon the disk must be placed sufficiently apart from one another such that the magnetic read/write fields applied to one data bit do not inadvertently alter neighboring data bits. This issue of providing buffering space between magnetic data bits is common in many forms of magnetic storage as used in both main and mass storage devices.

The developer of the present invention, Hewlett-Packard, Inc., has been researching ultra-high-density mass storage devices with storage areas sized on the nanometer scale. One particular field of such nanometer mass storage devices is probe based storage. In such a system a physical probe is moved from one memory location to another to read/write data to a particular location.

With respect to magnetic memory components, it is well known that as size decreases coercivity increases. A large coercivity is generally undesirable as it requires a greater electrical field to be switched, which in turn requires a greater power source and potentially larger conductor. Providing large power sources and large conductors is generally at odds with the focus of nanotechnology to reduce the necessary size of components. In addition, to mitigate the potential of inadvertently switching a neighboring memory cell, nanometer scaled memory cells are generally more widely spaced relative to their overall size than are non-nanometer sized memory cells. Moreover, as the size of the magnetic memory decreases, the unused space between individual memory cells tends to increase.

Hence, in a nanotip magnetic memory array a significant amount of overall space may be used simply to provide a physical buffer between the cells. Absent this buffering space, or otherwise reducing it's ratio, a greater volume of storage in the same physical space could be obtained. In addition, the large currents and potentially large conductors impose physical stresses upon the design and implementation of nanotip probes.

Hence, there is a need for an ultra-high density nanotip memory array which overcomes one or more of the drawbacks identified above. The present invention satisfies one or more of these needs.

SUMMARY

This invention provides a nanotip magnetic memory array with thermally assisted switching.

In particular, and by way of example only, according to an embodiment of the present invention, this invention provides a thermal-assisted magnetic memory storage device including: a plurality of magnetic tunnel junction memory cells including a material wherein the coercivity is decreased upon an increase in temperature; and at least one movable probe with a distal tip positioned within close proximity of a given memory cell, the probe including; a support; a conductor joined to the support and forming the distal tip; and a heat generator joined to the support and proximate to the conductor of the probe.

Moreover, according to an embodiment thereof, the invention may provide a thermal-assisted magnetic memory storage device including: a plurality of memory cells, each memory cell including; at least one ferromagnetic data layer characterized by an alterable orientation of magnetization, the ferromagnetic data layer including a material wherein the coercivity is decreased upon an increase in temperature; an intermediate layer in contact with the data layer; a ferromagnetic reference layer in contact with the intermediate layer, opposite from the data layer; at least one movable probe with a distal tip positioned within close proximity of a given memory cell, the probe including; a support; a conductor joined to the support and forming the distal tip; and a heat generator joined to the support proximate to the conductor of the probe.

In yet another embodiment, the invention may provide a method of data storage in a thermal-assisted magnetic memory storage device having a plurality of magnetic tunnel junction memory cells including a data layer material wherein the coercivity is decreased upon an increase in temperature, the cells joined to a common electrical conductor, and at least one movable probe with a distal tip characterized by a conductor and a heat generator, the method including: positioning the distal tip proximate to a given memory cell; activating the heat generator of the distal tip to heat the data layer; and generating a magnetic field by supplying a current to the conductor of the probe, the magnetic field being greater than the coercivity of the heated data layer such that the orientation of magnetization of the data layer may be changed to store a data bit.

In still another embodiment, the invention may provide a computer system including: a main board; at least one central processing unit (CPU) joined to the main board; at least one memory store joined to the CPU by the main board, the memory store having a plurality of memory cells, each memory cell including; a plurality of memory cells, each memory cell including; at least one ferromagnetic data layer characterized by an alterable orientation of magnetization, the ferromagnetic data layer including a material wherein the coercivity is decreased upon an increase in temperature; an intermediate layer in contact with the data layer; a ferromagnetic reference layer in contact with the intermediate layer, opposite from the data layer; a conductor in electrical contact with the reference layer; at least one movable probe with a distal tip positioned within close proximity of a given memory cell, the probe including; a support; a conductor joined to the support and forming the distal tip; a heat generator for changing the temperature of the ferromagnetic data layer, the heat generator joined to the support proximate to the conductor of the probe.

These and other objects, features and advantages of the preferred method and apparatus will become apparent from the following detailed description, taken in conjunction with the accompanying drawings which illustrate, by way of example the principles of the invention.

DETAILED DESCRIPTION

Before proceeding with the detailed description, it is to be appreciated that the present invention is not limited to use or application with a specific type of magnetic memory. Thus, although the present invention is, for the convenience of explanation, depicted described with respect to typical exemplary embodiments, it will be appreciated that this invention may be applied with other types of magnetic memory.

Figure 1:
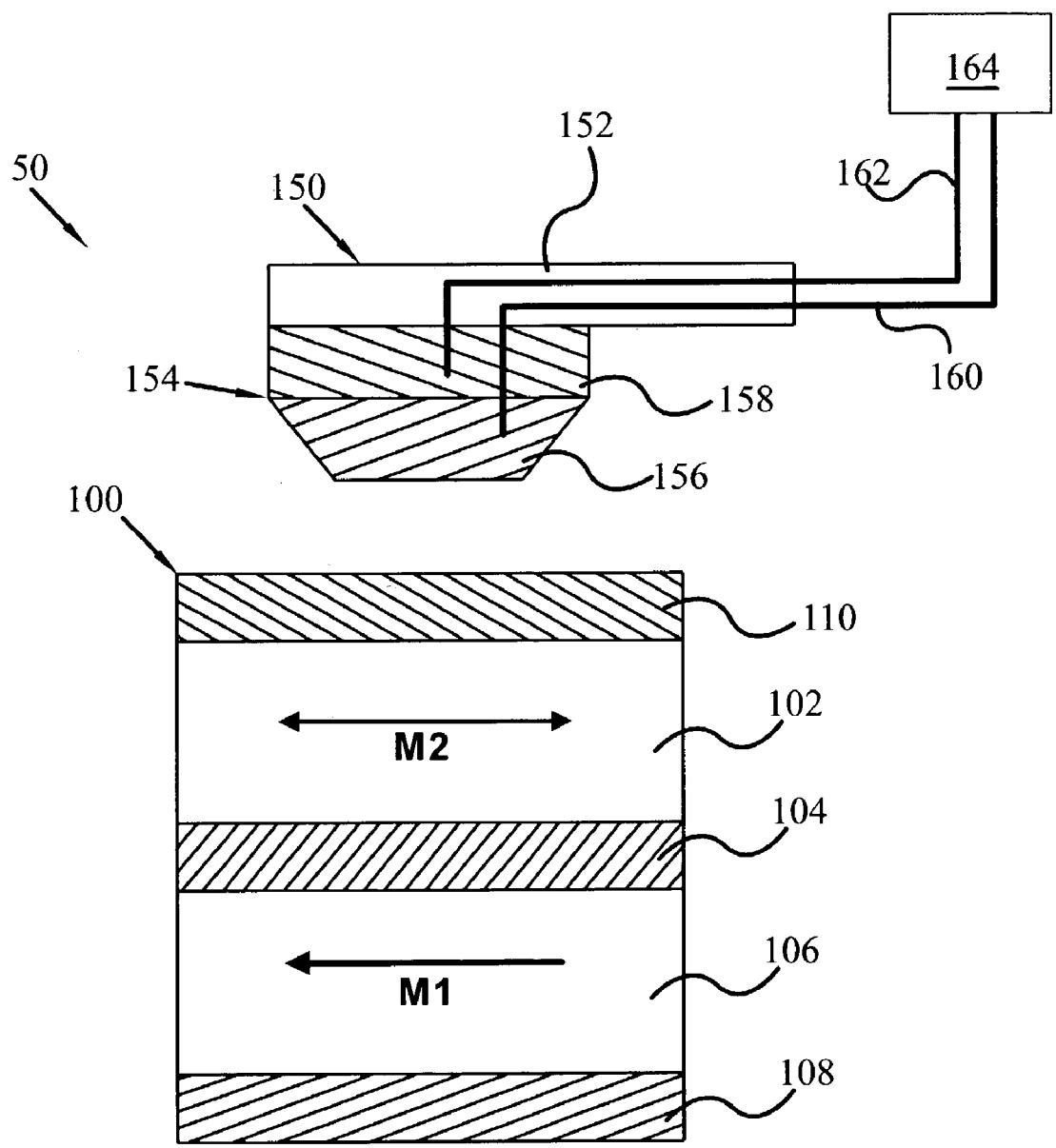
FIG. 1 shows a portion of an exemplary magnetic memory embodying the present invention.

Referring now to the drawings, and more particularly to FIG. 1, there is shown a portion of a nanotip magnetic memory with thermally assisted switching 50, having at least one magnetic memory cell 100 and movable probe 150 according to an embodiment of the present invention. In at least one embodiment, the magnetic memory cell 100 may be a magnetic tunnel junction memory cell. Specifically, the magnetic memory cell 100 may have a ferromagnetic data layer 102, a intermediate layer 104, a ferromagnetic reference layer 106 with a pinned orientation of magnetization M1, a conductor 108, and may or may not have an electrically conductive cap 110 in contact with the data layer 102. Under appropriate circumstances, reference layer 102 may be a soft reference layer having an orientation that is pinned-on-the-fly. It is termed "soft" because it generally comprises materials that are magnetically soft and are not of the usual hard-pinned materials used for more traditional pinned reference layers.

The ferromagnetic data layer 102 permits the storing of a bit of data as an alterable orientation of magnetization M2, and consists of a material wherein the coercivity is decreased upon an increase in temperature. The intermediate layer 104 has opposing sides such that the data layer 102 in contact with one side is in direct alignment with, and substantially uniformly spaced from, the reference layer 106, in contact with the second side of the dielectric intermediate layer 104. The conductor 108 is in electrical contact with the pinned reference layer 106. In at least one embodiment, the ferromagnetic data layer 102 has a lower coercivity then the fixed reference layer 106. The ferromagnetic data layer 102 may be made from a material that includes, but it not limited to: Nickel Iron (NiFe), Nickel Iron Cobalt (NiFeCo), Cobalt Iron (CoFe), and alloys of such metals.

The movable probe 150 has an articulating support 152, a distal tip 154, a read conductor 156 and a heat generator 158. In at least one embodiment the read conductor 156 may form the distal tip 154. The tip 154 of probe 150 is sized to be substantially about the same size or smaller than the diameter of a given memory cell 100. As is conceptually shown, the tip may be conical, such that it is smaller proximate to the memory cell 100. In addition, for the ease of discussion the read conductor 156 and heat generator 158 have been illustrated separately. It us understood and appreciated that the read conductor 156 and heat generator 158 may be integrated as one and the same. Although one nanotip probe 150 is shown, under appropriate circumstances an array of movable nanotip probes may be provided and supported above an array of the memory cells 100.

The nanotip probe 150 is movable and as such can be moved from a location proximate to one memory cell 100 to a location proximate to another memory cell, such as the memory cell 100'. Specifically, the probe may be positioned along the X and Y coordinate axis above a given memory cell 100. The probe may then be positioned along the Z coordinate axis to permit the transfer of electrical current and heat energy between the nanotip probe 150 and a given memory cell 100. The heat energy may be transferred conductively, radiantly, or via a combination of both. In general, the X and Y movement to align with a specific memory cell 100 will occur before movement along the Z axis.

The movement articulation of nanotip probe 150 may be achieved by components that one skilled in the art of probe based storage would know to use in order to position a nanotip probe, or array of probes, above the memory cells 100. In at least one embodiment the movement articulation may be accomplished with the use of electrostatic, piezoelectric, or a combination of electrostatic and piezoelectric positioners such as have been achieved using current MEMS (micro electro mechanical system) devices.

Electrical connections, generally wires shown as lines 160 and 162, connect the read conductor 156 and the heat generator 158 to a remote power source 164. The power source permits the nanotip probe 150 to provide a localized heat and read current to the specifically designated memory cell 100. In at least one embodiment, the heat generator 158 may be a planar resistor, a current carrying coil or other such device capable of providing a localized heat source. The read conductor 156 of the probe 150 may be made from an electrically conductive material. Suitable materials for the read conductor 156 may include, but are not limited to: Copper (Cu), Aluminum (Al), Aluminum Copper (AlCu), Gold (Au), Silver (Ag), and alloys of such metals.

Figure 2:
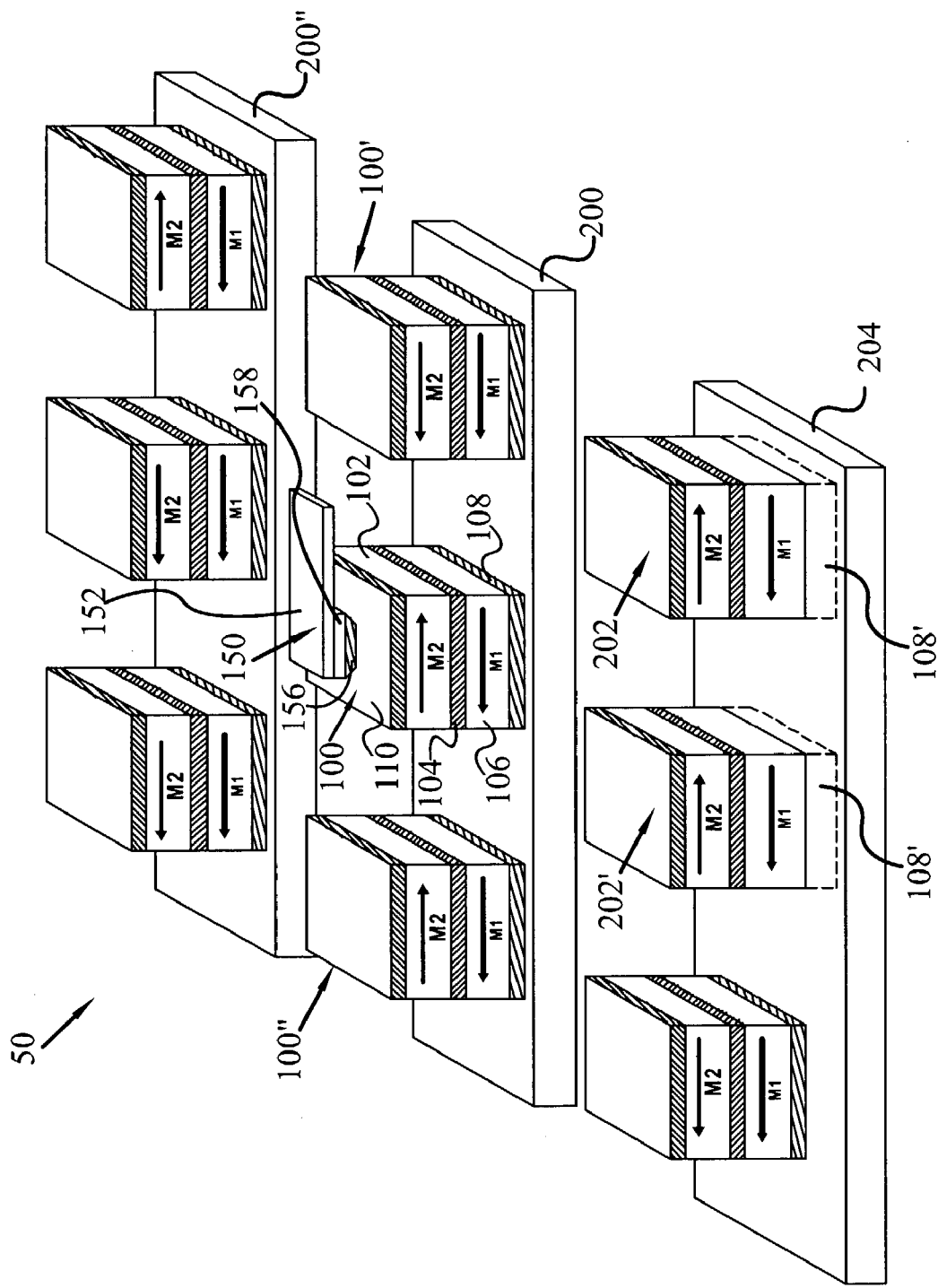
FIG. 2 is a perspective view of an array of memory cells as shown in FIG. 1.

As noted above, the magnetic memory 50 may have a plurality of memory cells 100 set out in an array. Each memory cell 100 may have it's own conductor 108, which may be in contact with a row conductor, common to memory cells 100 in a given row of the array as shown in FIG. 2. The conductor 108 of memory cell 100 may be joined to the common conductor 200, or as with memory cells 202 and 202', the conductor 108' may be an integral part of the common conductor 204. In at least one embodiment, the conductor 108 is common to a subset of the plurality of the memory cells 100. Under appropriate circumstances the subset may include the entire plurality of memory cells present in the array. In an alternative embodiment employing multiple probes 150, the cell conductor 108 may be a common conductor common to all memory cells accessible by a given probe 150. In addition, under appropriate circumstances the reference layer 106 may likewise be common to several or all memory cells in the array. In yet another embodiment, the array of memory cells 100 may be movable, achieved as described above with respect to the probe 150. The movement of the memory cells 100 may combine in harmony with the movement of the probe 150 or probes to further improve the relative speed of access to any particular memory cell 100. Under appropriate circumstances, the relative movement of the probe 150 or probes may be accomplished entirely by movement of the memory cells 100. With respect to embodiments providing multiple probes 150, the probes 150 may be moved in tandem along the X, Y and Z axes, or individually along one or more of the axes.

The phenomenon that causes the resistance in magnetic tunnel junction memory cell 100 is well understood in the magnetic memory art and is well understood for TMR memory cells. GMR and CMR memory cells have similar magnetic behavior but their magnetoresistance arises from different physical effects as the electrical conduction mechanisms are different. For instance, in a TMR-based memory cell, the phenomenon is referred to as quantum-mechanical tunneling or spin-dependent tunneling. In a TMR memory cell, the intermediate layer 104 is a thin barrier of dielectric material through which electrons quantum mechanically tunnel between the data layer 102 and pinned reference layer 106.

In a GMR memory cell, the intermediate layer 104 is a thin spacer layer of non-magnetic but conducting material. Here the conduction is a spin-dependent scattering of electrons passing between the data layer 102 and pinned reference layer 106 through the intermediate layer 104. In either case, the resistance between the data layer 102 and the pinned reference layer 106 will increase or decrease depending on the relative orientations of the magnetic fields M1 and M2. It is that difference in resistance that is sensed to determine if the data layer 102 is storing a logic state of "0" or a logic state of "1".

In at least one embodiment, the intermediate layer 104 is a tunnel layer made from an electrically insulating material (a dielectric) that separates and electrically isolates the data layer 102 from the pinned reference layer 106. Suitable dielectric materials for the dielectric intermediate layer 104 may include, but are not limited to: Silicon Oxide ($SiO_2$), Magnesium Oxide (MgO), Silicon Nitride ($SiN_x$), Aluminum Oxide ($Al_2O_3$), Aluminum Nitride ($AlN_x$), and Tantalum Oxide ($TaO_x$).

In at least one other embodiment, the intermediate layer 104 is a tunnel layer made from a non-magnetic material such as a 3d, a 4d, or a 5d transition metal listed in the periodic table of the elements. Suitable non-magnetic materials for a non-magnetic intermediate layer 104 may include, but are not limited to: Copper (Cu), Gold (Au) and Silver (Ag). While the actual thickness of the intermediate layer 104 is dependent upon the materials selected to create the intermediate layer 104 and the type of tunnel memory cell desired, in general, the intermediate layer 104 may have a thickness of about 0.5 nm to about 5.0 nm.

As stated, the nanotip probe 150 may be moved to a position substantially proximate to memory cell 100 to achieve electrical contact between the read conductor 156 and the data layer 102, or the cap 110 if present. The presence or absence of the conductive cap 110 is largely a matter of manufacturing preference. As in at least one embodiment the tip 154 of probe is brought into physical contact with a given memory cell 100, it may be desired to provide a protective cap layer over the exposed memory cell 100. The conductive cap 110 of the memory cell 100, if present, may be made from a similar conductive material as that of the read conductor 156 of the probe 150. An additional consideration when choosing material suitable for the cap 110 is that during operation, the cap may be subjected to some amount of wear over time, as the probe may get lowered, brought into contact and then raised again repeatedly, possibly to access the same bit location several times. Further still, due consideration should be given to take into account that at such microscopic dimensions friction forces can be particularly strong, and the tip/cap (154/110) layer surface should make and break contact cleanly.

The bit of data stored in the data layer 102 can be read during a read operation performed upon the magnetic memory cell 100 by passing the read current $I_R$ through the read conductor 156 of the nanotip probe 150 in electrical contact with memory cell 100 and then measuring the resistance between the data layer 102 and the pinned reference layer 106. The logical state of the bit as a "1" or a "0" can be determined by sensing the magnitude of the resistance.

Figure 3:
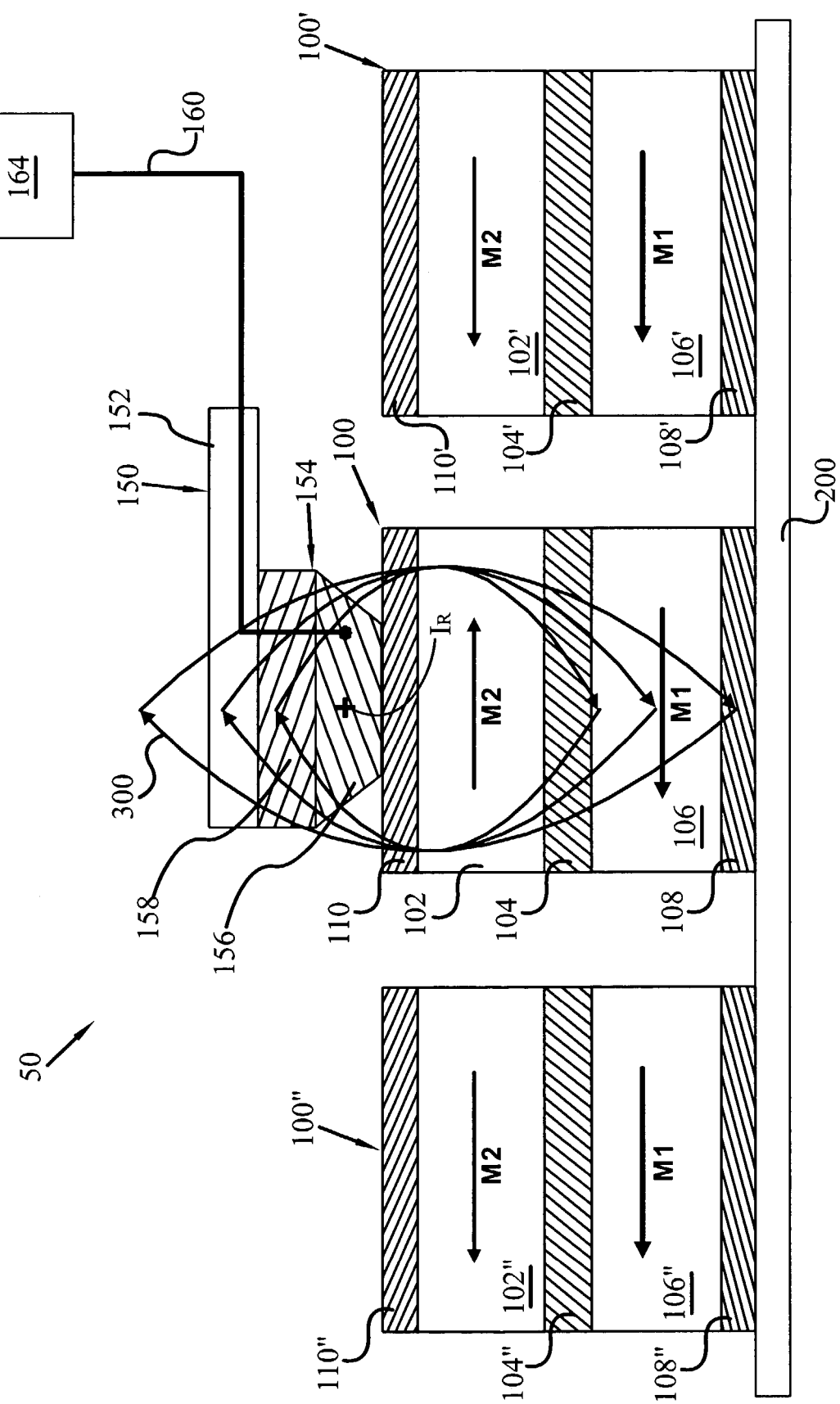
FIG. 3 is a side view illustrating the read operation of the memory shown in FIG. 1.

As shown in FIG. 3, an externally supplied read current $I_R$ of a predetermined magnitude and direction is supplied by wires 160 and passed through the read conductor 156 resulting in the generation of a magnetic field. As long as the read current $I_R$ is flowing, a resistance exists between the ferromagnetic data layer 102 and the pinned ferromagnetic reference layer 106 due to the flow of electrons between the data layer 102 and the reference layer 106 through the intermediate layer 104. By measuring the magnitude and/or change in that resistance the state of the data bit stored in the data layer 102 can be determined.

The read current $I_R$ is flowing into the page as indicated by the "+" symbol such that the magnetic field (represented by curved arrows 300) has a vector in the clockwise direction in accordance with the right-hand rule. The magnetic field 300 is not sufficient to overcome the coercivity of the unheated data layer 102 of the given magnetic cell 100. As such the alterable nature of the magnetic field M2 of the data layer 102 is substantially unchanged. As probe 150 is in preferably in contact only with a given magnetic cell 100, it is unlikely that the magnetic field 300 will adversely affect the data layers 102', 102" of the adjacent memory cells 100', 100" which are further removed from the influence of magnetic field 300 by their physical placement and lack of contact with probe 150.

It is generally appreciated in the magnetic memory arts that as the size of a magnetic bit decreases, the coercivity of the bit will increase. For example, a 0.2×0.3 nanometer bit may have a coercivity of about 40 Oe [1 Oe=1000/(4*pi) A/m], whereas a 0.8×0.16 nanometer bit may have a coercivity of about 100 Oe [1 Oe=1000/(4*pi) A/m]. In general, the coercivity of a material will decrease as temperature increases. For example a 100 Celsius degree rise in temperature may impart a drop in coercivity by about 50%. Upon a decrease in temperature to the original state, the original coercivity will generally return.

Figure 4:
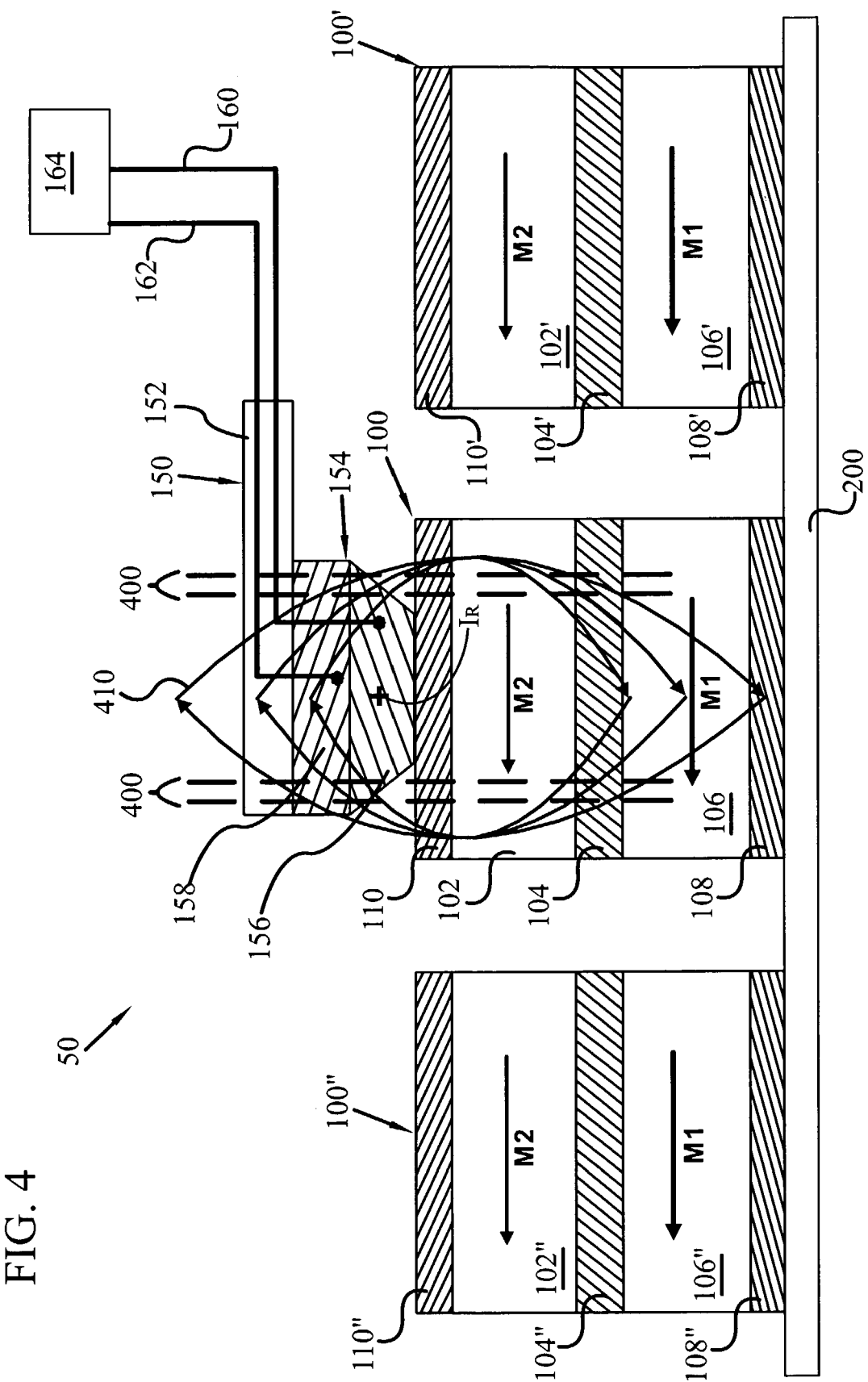
FIG. 4 is a side view illustrating the write operation of the memory shown in FIG. 1.

The ability of the memory 50 to store data is exemplified in FIG. 4. An externally supplied current may be supplied by wires 162 to heat generator 158 resulting in the generation of heat represented by dashed lines 400. The heat 400 may be directed into the given memory cell 100. An externally supplied current $I_R$ of a predetermined magnitude and direction is supplied by wires 160 and passed through the read conductor 156 resulting in the generation of a magnetic field. The current $I_R$ is flowing into the page as indicated by the "+" symbol such that the magnetic field has a vector in the clockwise direction in accordance with the right-hand rule (represented by curved arrows 410). The supplied current may be of substantially the same predetermined magnitude as used in the determination of the data bit based on the sensing of resistance described above. Under appropriate circumstances, the sensing of resistance to read a data bit may be performed substantially concurrently with the heating process to achieve the storage of a data bit.

Akin to the description of magnetic field 300 shown in FIG. 3, the magnetic field 410 of FIG. 4 is unlikely to adversely affect the data layers 102', 102" of the adjacent memory cells 100', 100" which are further removed from the influence of the magnetic field 410 by their physical placement and lack of contact with probe 150. As heat 400 has elevated the temperature of the data layer 102, the coercivity of data layer 102 is decreased. Whereas magnetic field 410 is unable to alter the nature of the magnetic field M2 of the data layer 102 in it's unheated state, the magnetic field 410 is sufficient to alter the magnetic field M2 of the data layer 102 in it's heated state. As the vector of the magnetic field 410 is to the left, M2 will be aligned to point to the left. It is to be appreciated that the relative field strengths of magnetic read fields 300 and 410 are substantially equal as they are generated by the same read conductor 156.

In further example, if the direction of current is reversed in read conductor 156, the resultant magnetic field will have a vector in the counter clockwise direction. When heat 400 is present to sufficiently elevate the temperature of data layer 102 and thereby reduce the coercivity, the counter clockwise vector of the magnetic field will align M2 to point to the right.

Moreover, the magnetic read field 410 is sufficient to overcome the coercivity of heated data layer 102. As the magnetic read field 410 may overcome the coercivity of the data bit 102, the orientation of the magnetization M2 may be altered from one orientation to another. In at least one embodiment, the change in orientation performed upon the heated data layer 102 does not affect the orientation of the adjacent non-heated data layers 102', 102".

As a result, in at least one embodiment, the bit to bit pitch of the memory cells 100 (distance between the center points of each cell) may be decreased. Such shortening of bit to bit pitch is advantageous as it permits a greater density of memory cells in a given space, and therefore greater memory capacity. In addition, as the magnetic fields 300, 410 generated by the read conductor are substantially the same for a read or write operation, manufacturing and design issues are simplified.

In at least one embodiment, the ferromagnetic data layer 102 has a lower coercivity then the fixed reference layer 106. The ferromagnetic data layer 102 comprising a material wherein the coercivity is decreased upon an increase in temperature may be made from a material that includes, but it not limited to: Nickel Iron (NiFe), Nickel Iron Cobalt (NiFeCo), Cobalt Iron (CoFe), and alloys of such metals.

The read conductor 156 of the probe 150 may be made from an electrically conductive material. Suitable materials for the read conductor 156 may include, but are not limited to: Copper (Cu), Aluminum (Al), Aluminum Copper (AlCu), Gold (Au), Silver (Ag), and alloys of such metals. Similarly, the conductive cap 110 of the memory cell 100, if present may be made from a similar conductive material.

As shown in FIGS. 1 through 4, in at least one embodiment the data layer 102 of the memory cells 100 is located above the pinned reference layer 106. In at least one embodiment, such top location may reduce both the time and or intensity of localized heating in reducing the coercivity of the data layer 102. In addition, such top location may reduce the magnitude of the magnetic field required to switch the magnetic orientation M2 once the coercivity has been lowered.

Having described the above physical embodiment of the magnetic memory array 50, another embodiment relating to the method of use will now be described with reference to FIGS. 5A, 5B and 5C. It will be appreciated that the described method need not be performed in the order in which it is herein described, but that this description is merely exemplary of one method of using a nanotip magnetic memory with thermally assisted switching 50, in accordance with the present invention.

Figure 5B:
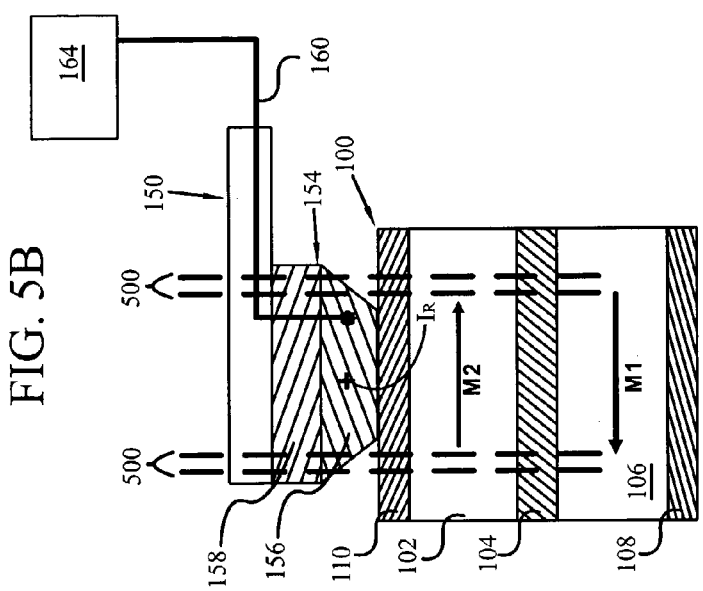
FIGS. 5a through 5c illustrate a method of storing data in the memory of FIG. 1.
Figure 5A:
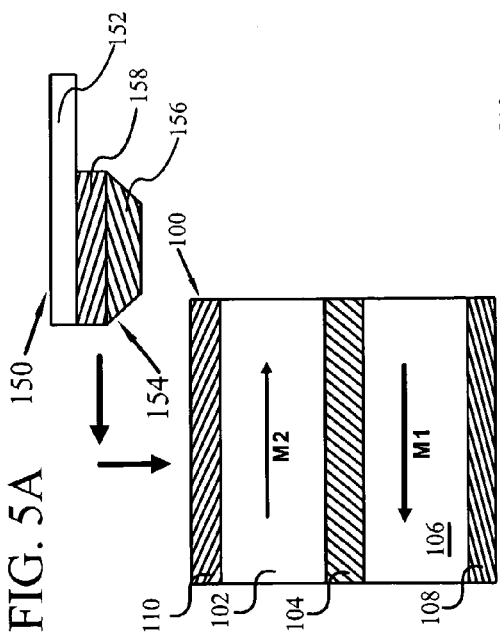

As shown in FIG. 5A, the distal tip 154 of the probe 150 is positioned proximate to a given memory cell. More specifically the probe is positioned such that thermal influence over the given memory cell alone is established. In at least one embodiment such positioning may involve physical contact between the distal tip 154 and the given memory cell 100.

The heat generator 158 of the distal tip 154 is activated such that heat, represented by dashed lines 500, is directed into the given memory cell 100, and more specifically the data layer 102, see FIG. 5B. Activation of the heat generator 158 is accomplished by delivering a current through wires 162 from the remote power source 164.

Figure 5C:
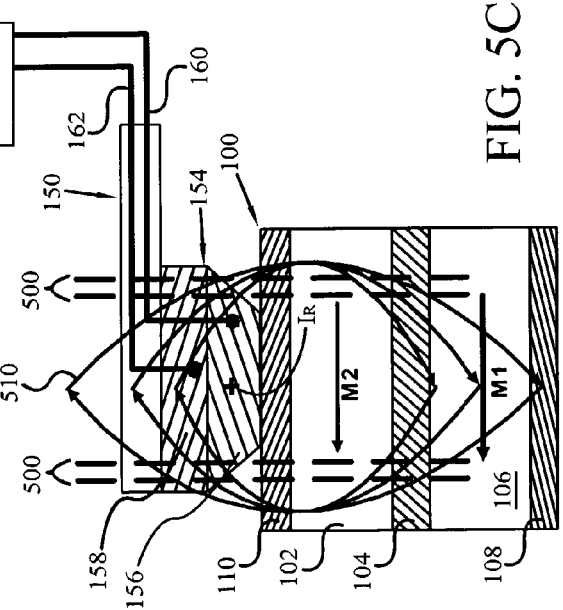

In FIG. 5C, a magnetic field, represented by arrows 510, is generated by supplying a current $I_R$ of a predetermined magnitude and direction to the read conductor 156 from remote power source 164 by wires 160. This current $I_R$ may be substantially the same as that supplied in a read operation wherein the resistance across the given memory cell 100 is sensed. The clockwise or counter clockwise vector of magnetic field 510 is determined by the desire to orient the magnetic field M2 of data layer 102 as parallel or anti-parallel to that of pinned reference layer 106. As shown in this example, the vector of the magnetic field is clockwise. The heat 500 lowers the coercivity of the data layer 102.

When the coercivity of the data layer 102 falls below the intensity of the magnetic field 510, the magnetic field M2 of the data layer 102 will align with the vector of the magnetic field 510 produced by the read conductor 156. Following a reasonable time, and or a confirmation of orientation based on reading the resistance between the data layer 102 and the reference layer 106, the heat generator 158 and read conductor 156 may be turned off. In at least one embodiment, the read operation of sensing resistance may be performed contemporaneously with the heating of the write operation. In such substantially contemporaneous operation, the sensed change in resistance may be used to determine when the magnetic field M2 has aligned with the vector of magnetic field 510.

It should be noted that if the magnetic field M2 of the data layer 102 is already in line with the magnetic field 510 the field M2 will not reverse it's orientation even though the coercivity of the data layer has been sufficiently reduced. Moreover, if the field M2 is already in line with field 510 it will remain in line.

Another embodiment may be appreciated to be a computer system incorporating the magnetic memory 50. As has been described above, the physical size of magnetic memory 50 is quite small, thereby permitting a greater volume of storage in the same physical space over contemporary memory devices. Further, the movement of the probe 120 is over very small distances permitting quick access times and reduced latency. A computer with a main board, CPU and at least one memory store comprised of magnetic memory 50 is advantageously fast.

While the invention has been described with reference to the preferred embodiment, it will be understood by those skilled in the art that various alterations, changes and improvements may be made and equivalents may be substituted for the elements thereof and steps thereof without departing from the scope of the present invention. In addition, many modifications may be made to adapt to a particular situation or material to the teachings of the invention without departing from the essential scope thereof. Such alterations, changes, modifications, and improvements, though not expressly described above, are nevertheless intended and implied to be within the scope and spirit of the invention. Therefore, it is intended that the invention not be limited to the particular embodiments disclosed as the best mode contemplated for carrying out this invention, but that the invention will include all embodiments falling within the scope of the appended claims.

I claim:

1. A thermal-assisted magnetic memory storage device comprising:
   a plurality of magnetic tunnel junction memory cells comprising a material wherein the coercivity is decreased upon an increase in temperature; and
   at least one movable probe with a distal tip positioned within close proximity of a given memory cell, the probe including;
      a support;
      a conductor joined to the support and forming the distal tip; and
      a heat generator joined to the support and proximate to the conductor of the probe.

2. A thermal-assisted magnetic memory storage device comprising:
   a plurality of memory cells, each memory cell including;
      at least one ferromagnetic data layer characterized by an alterable orientation of magnetization, the ferromagnetic data layer comprising a material wherein the coercivity is decreased upon an increase in temperature;
      an intermediate layer in contact with the data layer;
      a ferromagnetic reference layer in contact with the intermediate layer, opposite from the data layer;
   at least one movable probe with a distal tip positioned within close proximity of a given memory cell, the probe including;
      a support;
      a conductor joined to the support and forming the distal tip; and
      a heat generator joined to the support proximate to the conductor of the probe.

3. The thermal-assisted magnetic memory storage device of claim 2, wherein the reference layer is characterized by a pinned orientation of magnetization.

4. The thermal-assisted magnetic memory storage device of claim 2, wherein the reference layer is a soft reference layer, the layer having a non-pinned orientation of magnetization.

5. The thermal-assisted magnetic memory storage device of claim 2, wherein the conductor of the probe and the heat generator are substantially one and the same component.

6. The thermal-assisted magnetic memory storage device of claim 2, wherein during a write operation the probe is moved to thermally influence a given memory cell;
wherein the given memory cell is warmed by heat generated by a current flowing through the heat generator of the probe;
wherein a magnetic field is generated by current flowing through the conductor of the probe; and
wherein the orientation of magnetization of the data layer may be changed, the magnetic field generated by the conductor of the probe being greater than the coercivity of the warmed data layer.

7. The thermal-assisted magnetic memory storage device of claim 2, wherein the tip of the probe is sized to be substantially about the same diameter of a given memory cell.

8. The thermal-assisted magnetic memory storage device of claim 2, wherein the tip of the probe is sized to be smaller than the diameter of a given memory cell.

9. The thermal-assisted magnetic memory storage device of claim 2, wherein each memory cell further includes a conductor in electrical contact with the reference layer of each memory cell.

10. The thermal-assisted magnetic memory storage device of claim 9, wherein during a read operation the probe is moved to electrically contact a given memory cell;
wherein a read current is provided to flow through the conductor of the probe; and
wherein the resistance of the current flowing through the given cell from the conductor of the probe to the conductor of the memory cell is measured.

11. The thermal-assisted magnetic memory storage device of claim 10, wherein the magnetic field generated by the conductor of the probe is less than the coercivity of the unheated data layer of the given memory cell.

12. The thermal-assisted magnetic memory storage device of claim 9, wherein the memory cell conductor in electrical contact with the ferromagnetic reference layer is common to a subset of the plurality of memory cells.

13. The thermal-assisted magnetic memory storage device of claim 9, wherein the ferromagnetic reference layer is common to a subset of the plurality of memory cells.

14. The thermal-assisted magnetic memory storage device of claim 2, wherein the plurality of memory cells are arranged as an array.

15. The thermal-assisted magnetic memory storage device of claim 2, wherein the array is subdivided into at least two fields, each field of memory cells receiving one of the movable probes.

16. The thermal-assisted magnetic memory storage device of claim 15, wherein the multiple probes move in tandem along the X, Y and Z axes.

17. The thermal-assisted magnetic memory storage device of claim 15, wherein the multiple probes move individually along one or more of the X, Y and Z axes.

18. The thermal-assisted magnetic memory storage device of claim 2, wherein movement of the probe permits electrical contact between the tip and a given memory cell.

19. The thermal-assisted magnetic memory storage device of claim 2, wherein movement of the probe permits pressure contact between the tip and a given memory cell.

20. The thermal-assisted magnetic memory storage device of claim 2, wherein the conductor of the movable probe is an electrically conductive material.

21. The thermal-assisted magnetic memory storage device of claim 2, wherein the heat generator of the movable probe is a planar resistor or a current carrying coil.

22. The thermal-assisted magnetic memory storage device of claim 2, further including a conductive cap in contact with the data layer, opposite the tunnel layer.

23. The thermal-assisted magnetic memory storage device of claim 2, wherein the intermediate layer is a tunnel layer.

24. The thermal-assisted magnetic memory storage device of claim 23, wherein the tunnel layer is a dielectric material.

25. The thermal-assisted magnetic memory storage device of claim 24, wherein the dielectric material is a material selected from the group consisting of Silicon Oxide, Magnesium Oxide, Silicon Nitride, Aluminum Oxide, Aluminum Nitride, and Tantalum Oxide.

26. The thermal-assisted magnetic memory storage device of claim 23, wherein the tunnel layer is a spacer layer made from a non-magnetic material selected from the group consisting of a 3*d*, a 4*d*, and a 5*d* transition metal.

27. The thermal-assisted magnetic memory storage device of claim 26, wherein the non-magnetic material is a material selected from the group consisting of copper, gold, and silver.

28. A method of data storage in a thermal-assisted magnetic memory storage device having a plurality of magnetic tunnel junction memory cells comprising a data layer material wherein the coercivity is decreased upon an increase in temperature, the cells joined to a common electrical conductor, and at least one movable probe with a distal tip characterized by a conductor and a heat generator, the method comprising:
positioning the distal tip proximate to a given memory cell having an intermediate layer in contact with the data layer and a reference layer in contact with the intermediate layer, opposite from the data layer;
activating the heat generator of the distal tip to heat the data layer; and
generating a magnetic field by supplying a current to the conductor of the probe, the magnetic field being greater than the coercivity of the heated data layer such that the orientation of magnetization of the data layer may be changed to store a data bit.

29. The method of data storage of claim 28, wherein the step of positioning comprises physically contacting the memory cell with the distal tip.

30. A computer system comprising:
a main board;
at least one central processing unit (CPU) joined to the main board;
at least one memory store joined to the CPU by the main board, the memory store having a plurality of memory cells, each memory cell including;
a plurality of memory cells, each memory cell including;
at least one ferromagnetic data layer characterized by an alterable orientation of magnetization, the ferromagnetic data layer comprising a material wherein the coercivity is decreased upon an increase in temperature;
an intermediate layer in contact with the data layer;

a ferromagnetic reference layer in contact with the intermediate layer, opposite from the data layer;
a conductor in electrical contact with the reference layer;
at least one movable probe with a distal tip positioned within close proximity of a given memory cell, the probe including;
a support;
a conductor joined to the support and forming the distal tip;
a heat generator for changing the temperature of the ferromagnetic data layer, the heat generator joined to the support proximate to the conductor of the probe.

* * * * *